D. DEBBAS.
MACHINE FOR MANUFACTURING LEADEN SEALS.
APPLICATION FILED NOV. 18, 1910.

1,083,198.

Patented Dec. 30, 1913.

D. DEBBAS.
MACHINE FOR MANUFACTURING LEADEN SEALS.
APPLICATION FILED NOV. 18, 1910.

1,083,198.

Patented Dec. 30, 1913.

Witnesses:
Floyd R Cornwall
Jos. A. Ryan

Inventor:
Démétrius Debbas
            Attorney.

COLUMBIA PLANOGRAPH CO., WASHINGTON, D. C.

D. DEBBAS.
MACHINE FOR MANUFACTURING LEADEN SEALS.
APPLICATION FILED NOV. 18, 1910.

1,083,198.

Patented Dec. 30, 1913.

Witnesses:
Inventor:
Démétrius Debbas
Attorney.

UNITED STATES PATENT OFFICE.

DÉMÉTRIUS DEBBAS, OF PARIS, FRANCE.

MACHINE FOR MANUFACTURING LEADEN SEALS.

1,083,198.  Specification of Letters Patent.  Patented Dec. 30, 1913.

Application filed November 18, 1910. Serial No. 593,081.

*To all whom it may concern:*

Be it known that I, DÉMÉTRIUS DEBBAS, a subject of the King of Greece, and resident of Paris, France, have invented certain new and useful Improvements in and Relating to Machines for Manufacturing Leaden Seals, of which the following is a specification.

This invention relates to a machine for producing lead seals for various well known commercial purposes.

The seal which is the product of the machine consists of a lead disk permanently associated with a suitable cord and a lead sleeve which is slidable on the cord and is designed to be fitted in a recess in the disk.

The object of the invention is to provide an improved construction and organization of instrumentalities for producing a seal of the character referred to and serving to effect in a simple and rapid manner the operations of melting the lead, simultaneously molding the lead parts of the seal and associating these parts with the cord, cutting the cord after the operation of the mold into required lengths, delivering the seals in lots of determined number, intermittently drawing out the cord in relation to the molding and cutting instrumentalities and putting an even tension on the cord during the intervals between the operations of the drawing out device.

The invention is illustrated in the accompanying drawings, wherein:—

Similar characters of reference designate corresponding parts throughout the several views.

Figure 5:
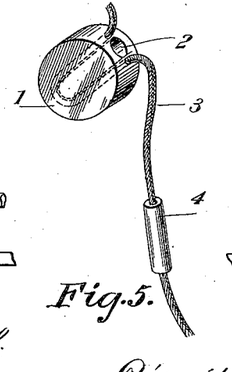
Fig. 5 is a perspective view of the manufactured leaden seal.

The seal produced by the machine is illustrated in Fig. 5 and comprises a relatively large lead disk 1, a cord 3, and a lead sleeve 4. The disk is provided with a diametrically arranged recess 2, having a closed end and the sleeve 4, which is slidable in the cord is adapted to fit into this recess in the manner of a plug. The cord 3, is permanently associated with the disk 1, the latter being cast on a U-shaped bight of said cord.

Figures 1, 10, 11, 12, 13:
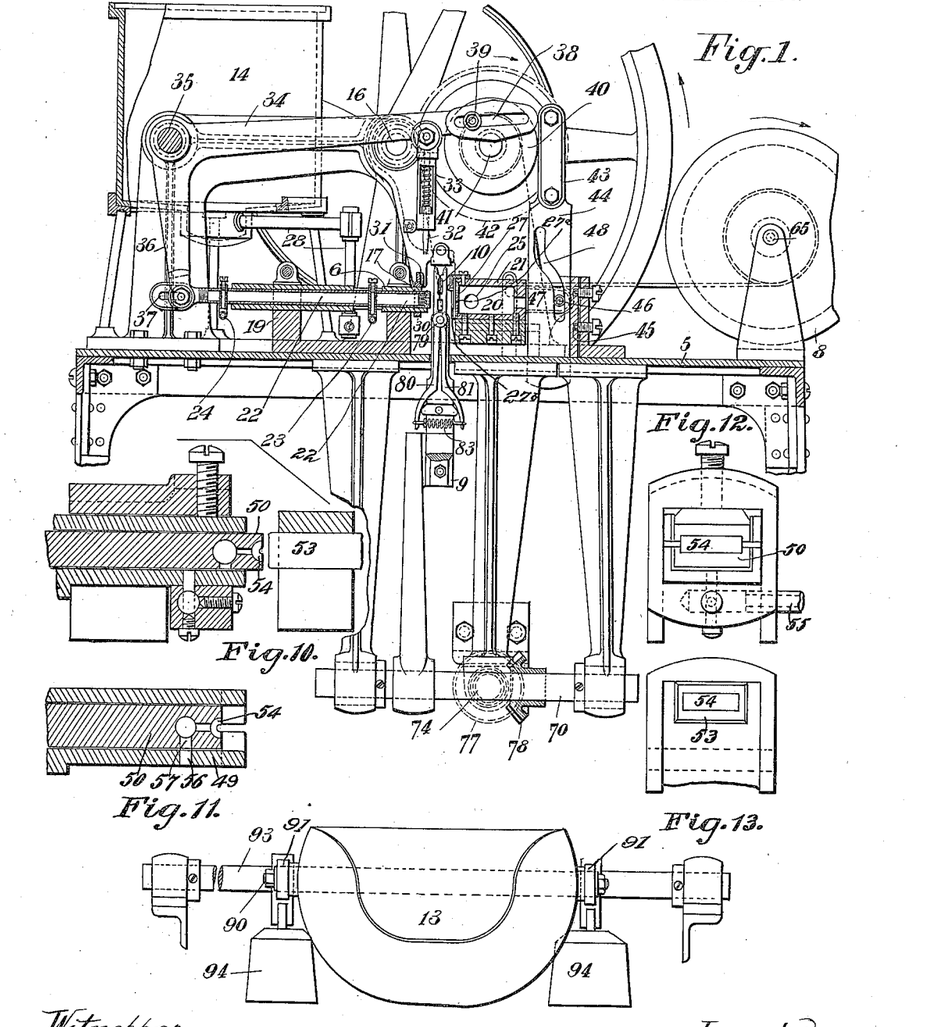
Figure 1 shows a section of the machine on line A—A of Fig. 3.
Fig. 10 is an enlarged detail vertical section of the mold, and the coöperating plunger.
Fig. 11 is a similar view of the mold, same being withdrawn in its housing.
Fig. 12 is a detail face view of the mold.
Fig. 13 is a detail face view of the mold, plunger and its support.
Figure 3:
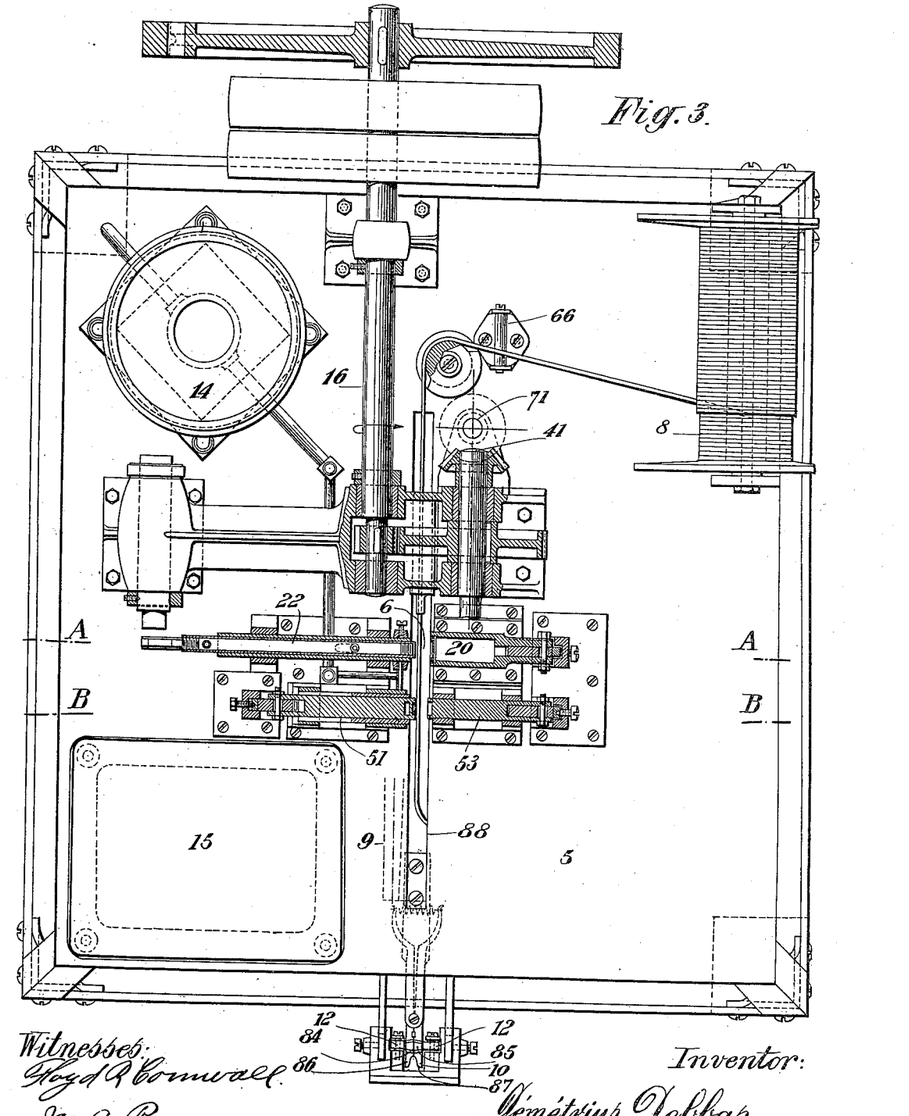
Fig. 3 shows a top plan view of the machine, with parts in section.
Figures 4, 16:
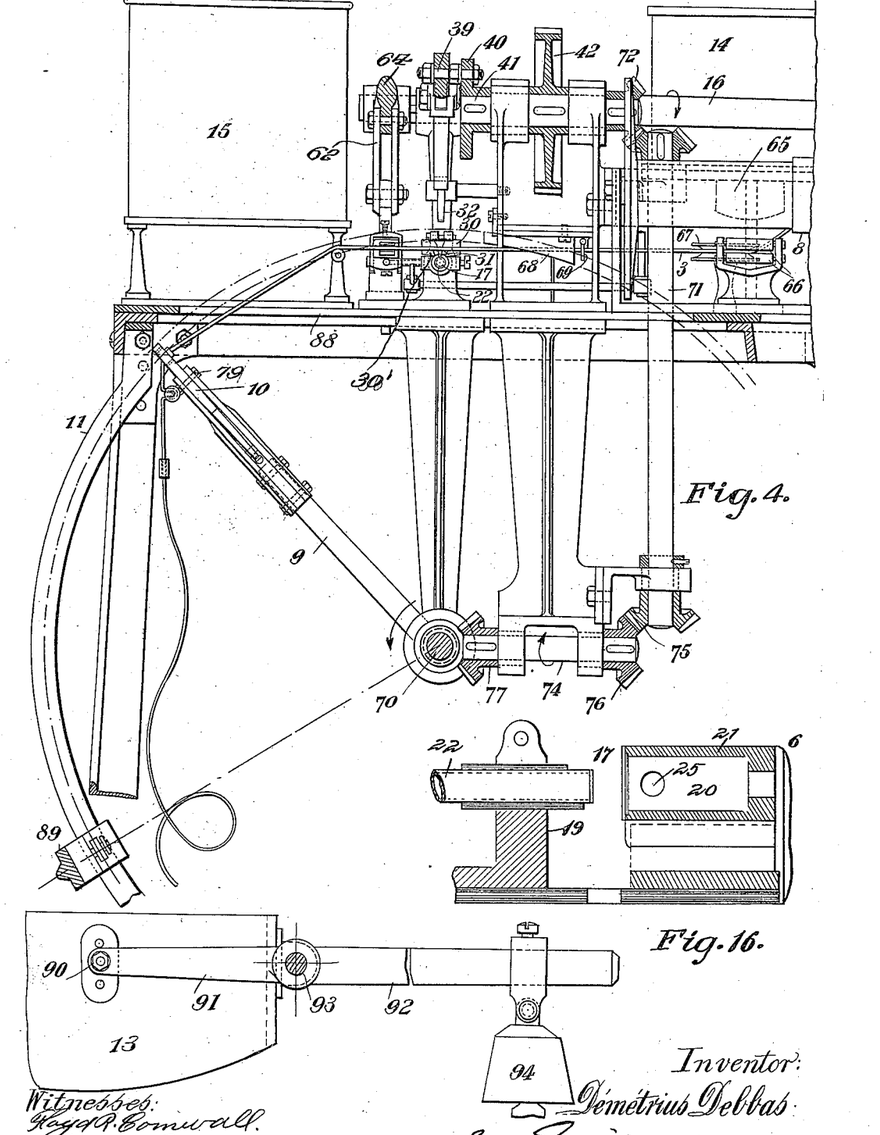
Fig. 4 is a side elevation of the same.
Fig. 16 is an enlarged detail vertical section of one of the molds.
Figures 6, 17, 18, 19:
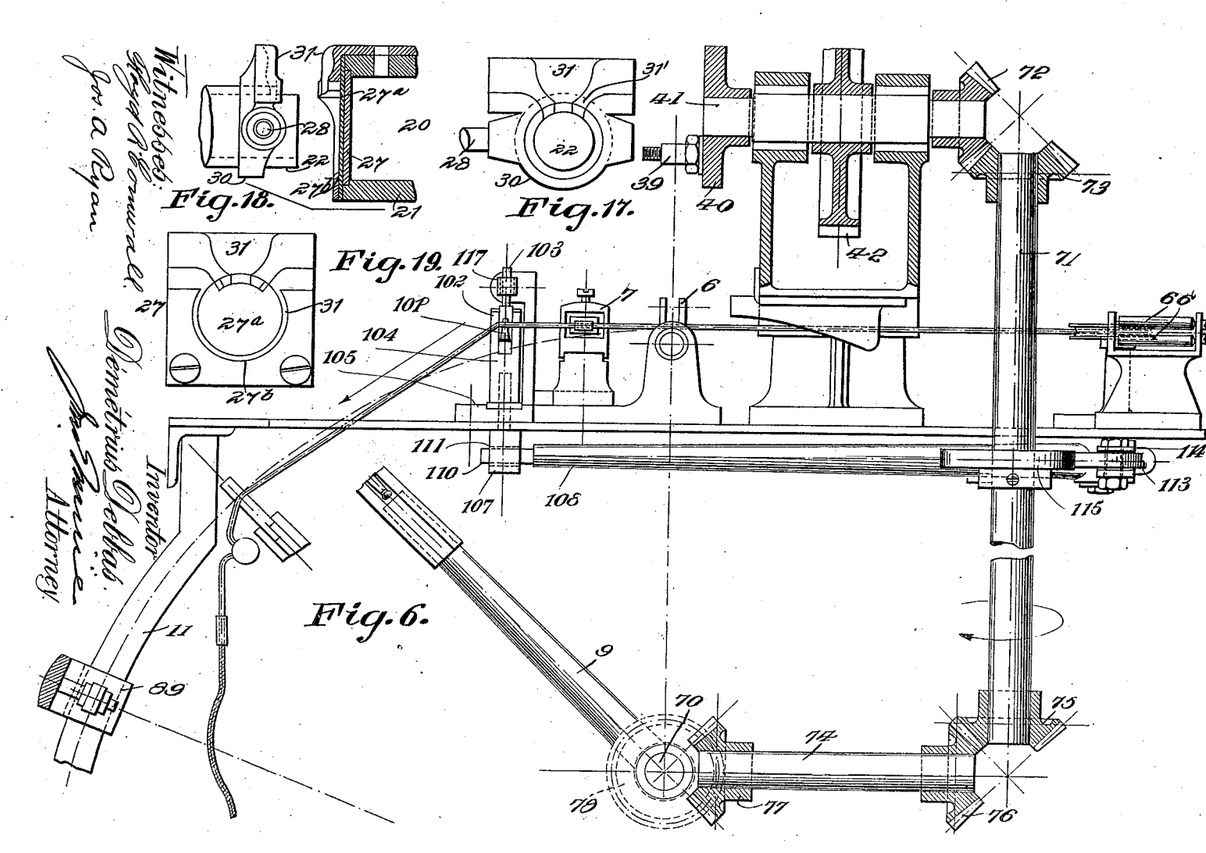
Fig. 6 shows in side elevation a device adapted to hold the cord at the level of the molds during the casting operation, this figure showing the cord tensioned at the level of the molds and drawn under the table by the feeding arm.
Fig. 17 is an enlarged detail face view of a clip.
Fig. 18 is an enlarged detail partially vertical section and elevation of the adjacent ends of the mold.
Fig. 19 is a detail face view of the female part of the mold shown in Fig. 18.
Figure 7:
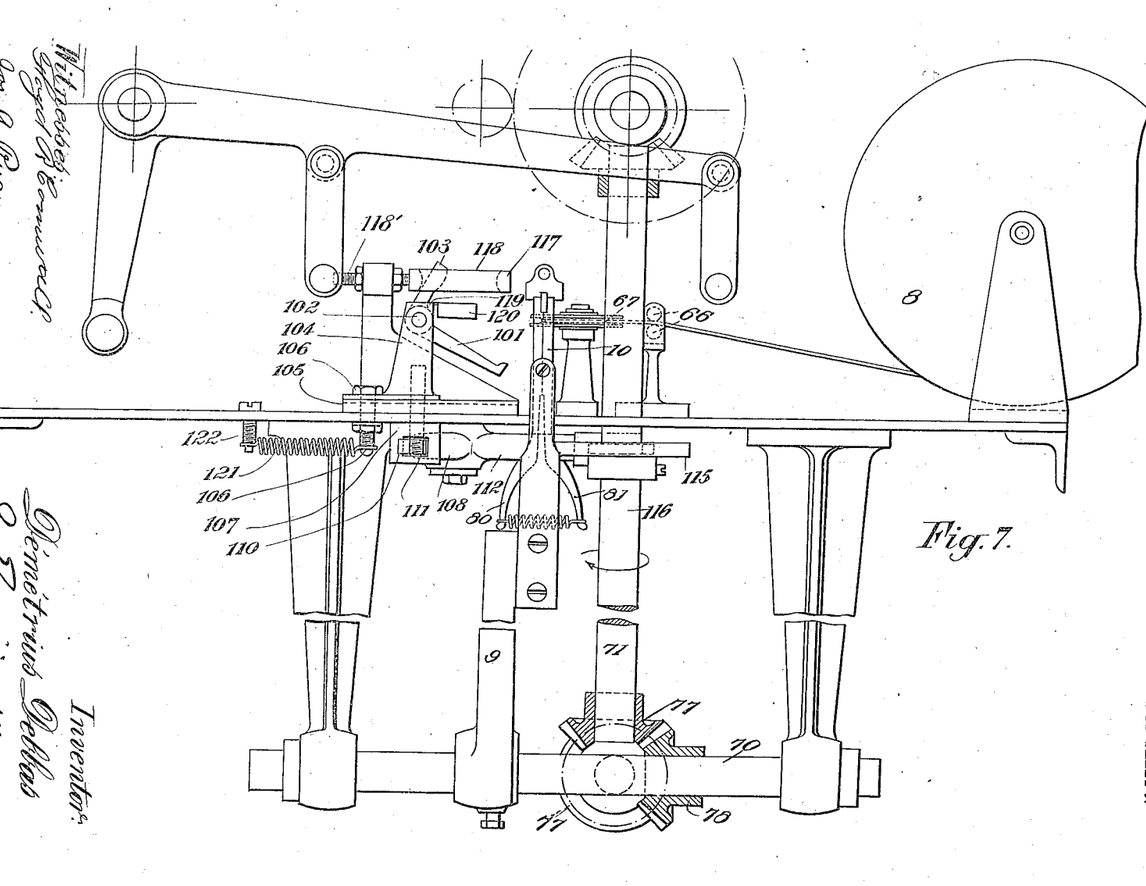
Fig. 7 is a front elevation of the same, the feeding arm being above the table in front of the molds and seizing the cord. At this moment the finger intended to raise the cord is lowered and disengages the slot of the table so as to leave the passage free for the feeding arm.
Figure 8:
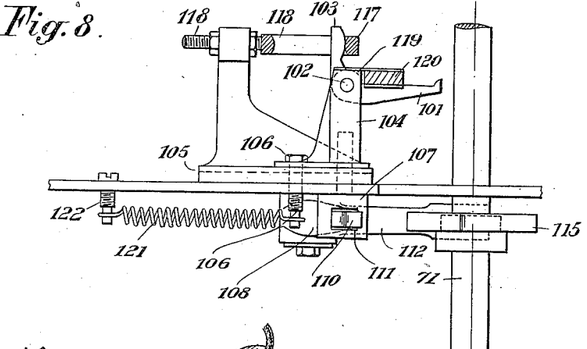
Fig. 8 shows the members shown by Figs. 6 and 7 after the passage of the feeding arm in front of the molds, the said finger being raised and pushed over the slot.
Figure 9:
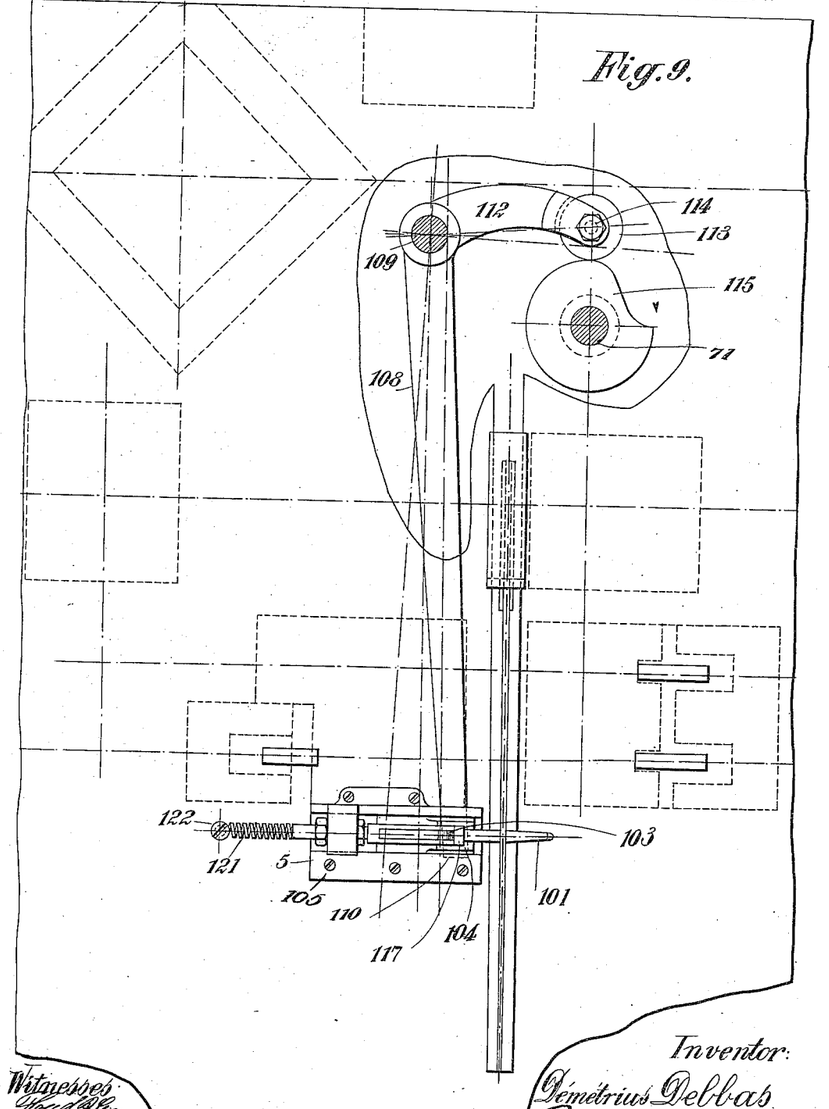
Fig. 9 shows a top plan view of all the members of the device which causes the finger to work automatically.
Figure 14:
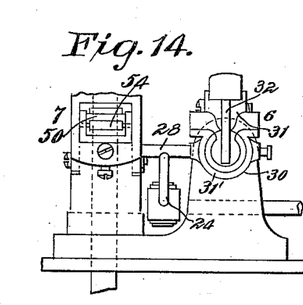
Fig. 14 is an enlarged face view of the mold and associated parts.
Figure 15:
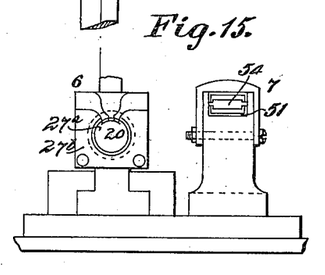
Fig. 15 is a similar view of the mold plungers and their supports.

The main operating parts of the machine are supported from a table 5, and, considered from a broad aspect, comprise a molding apparatus designated generally by the numeral 6, for producing the lead disk and for associating the disk with the cord; a molding apparatus designated generally by the numeral 7, for producing the lead sleeve and for associating the sleeve with the cord; a spool 8, which carries a suitable length of cord; a feeding arm 9 shown more particularly in Fig. 6, by which the cord is unwound from the spool and is brought into relation to the operating instrumentalities, the arm being provided with a clip 10 shown in Figs. 1 and 7, which is adapted to seize and cut the cord; a pair of sectors 11, arranged under the table and between which the clip 10, passes, the sectors being provided with rollers 12 shown particularly in Figs. 3, 4, and 6, to act on the clip and cause the latter to cut the cord; a receptacle 13, to receive the finished seals after the cutting operation and to deliver them in lots of determined number to any suitable package; a crucible 14, in which the lead is melted; a receptacle 15 which contains water to be used in cooling the molds; and various other instrumentalities to be particularly specified for effecting the operations of the parts referred to.

The various operative parts are driven through suitable connections from a main shaft 16, which may be turned by hand or coupled to a suitable motor. The operating parts are preferably so related and proportioned that for a speed of sixty revolutions per minute of the shaft 16, a production of 9,000 seals for a ten hour working day is obtained, i. e., one seal is produced every four seconds.

The mold 6, consists of coöperating dies 17 and 20. The die 17 embodies a tubular part fixed in a stationary support 19, and having a collar 30, fitted in the forward end thereof, and a plunger 22, which is of hollow construction and is reciprocated axially through the said tubular part. The office of the plunger is two-fold, its first function being to coöperate with the die 20, in the molding operation; and its second function being to eject the finished disk.

The plunger 22 is provided with connections 23 and 24, for pipes which lead from and return to the tank 15, and by means of which a circulation of water to cool the plunger may be obtained. The die 20, embodies a box 21, which is mounted for sliding movement and is provided with openings 25, through which air may circulate for cooling purposes. An asbestos plate 27, constitutes a closure for the front of the box and is reinforced by a steel washer 27ª, and held in place by a retaining flange 27ᵇ. The box 21, is coaxial with the plunger 22, and the plate 27, is immediately alined with the face of said plunger. The ring 30, and the washer 27ª are also alined and are provided with complementary recesses 31, which when said plate and said washer are held against one another, afford an opening (Figs. 1 and 4) to provide for the passage of a core 32. The ring 30, and washer 27, are also provided with thread guide recesses 30' which complement one another in like manner.

Lead is supplied to the mold from the crucible 14, by a pipe 28, which is joined to the ring 30, the latter and the tubular part of the mold support 19 being formed with openings, through which the lead flows into the inclosed mold space and which are controlled, i. e., closed or opened at the proper times by the plunger 22.

The core 32, which forms the recess 2, in the disk 1, is yieldably mounted in a core carrier 33, which is in turn hung from an actuating lever 34. The latter is keyed on a shaft 35, and is provided with a depending arm 36, which at its lower end is pivoted to the rear end portion of the plunger 22, the pivot pin passing through a slot 37, formed in the plunger. The lever 34, is provided near its forward end with a slot 38, to receive a wrist pin 39 of a disk 40. The disk 40, is keyed in a shaft 41 which is parallel to the motor shaft 16, and is actuated by the latter at a speed of one revolution every four seconds through the medium of a gearing 42.

Figure 2:
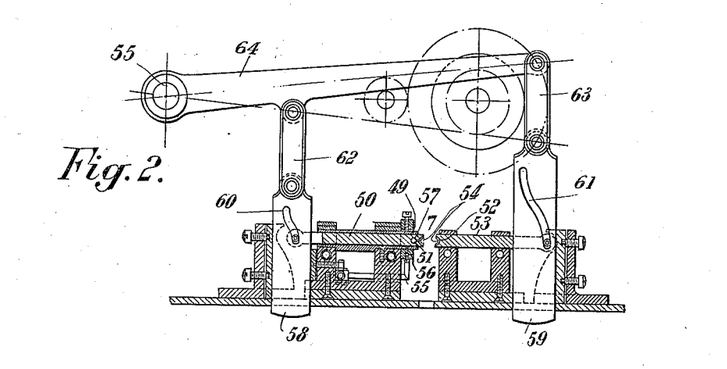
Fig. 2 is a sectional view on line B—B of the same figure.

Suspended from the free end of the lever 34 by means of the connecting rod 43 is the cam slide 44 which is adapted to move vertically in a guide 45 of the framework of the machine and to consequently impart to the horizontal die 20 a reciprocating motion through the medium of the pin 46 which is secured to an extension 47 of said die and engages the cam groove 48 of the slide 44. The mold 7, for forming the sleeve 4, is generally similar in its construction to the mold 6 and comprises a stationary guide way 49 having the shape of a U and carried by the framework of the machine in parallel relation to the tube of the die 17. A plunger 50 moves longitudinally in the guideway 49, the front end of this piston carrying one of the halves 51 of the mold (Fig. 2). The other half 52 of this mold is carried by another plunger 53, arranged in axial alinement with the plunger 50. The mold dies 51 and 52, have in their adjoining faces complementary recesses 54, which when said dies are held against one another form an opening through which the cord passes and in which the sleeve 4, is formed and associated with said cord. The lead is fed into the closed mold by means of the pipe 55 opening out in the guide way 49 through an opening 56 which at a given moment and in a determined position of the plunger 50 may be brought to coincide with a passage 57 provided in the plunger 50 and communicating with the mold 51—52. The two plungers 50 and 53 are actuated by respective slides 58 and 59 provided with the cam grooves 60 and 61 and suspended through the medium of respective connecting rods 62 and 63 from a lever 64 which is keyed on the shaft 35 aforesaid.

The cord coming from the spool 8 which rotates loosely on a shaft 65 is conveyed by rollers 66, a horizontal grooved pulley 67 and a thread guide 68 to the guide recesses 30' of the disk mold 6 and through the passages 54 of the mold for the sleeve. The cord also passes through a gage 69 and during the casting operation rests on a movable finger to be hereinafter described.

The cord feeding device of the machine comprises an arm 9 mounted on a shaft 70 positioned under the table in parallel relation to the plungers of the molds. This shaft 70 is actuated by the shaft 41 through the instrumentality of a vertical shaft 71, of the bevel wheels 72 and 73, of a short horizontal shaft 74 and bevel wheels 75, 76, 77 and 78. The arm 9 carries at its free end through the instrumentality of a pivot 79, the tongs 10 which are formed with respective extensions 80 and 81 the rear separated ends of which are connected together by a coiled spring 83 The tongs carry near their front ends the knife edges 84 and 85 which are intended to first seize and afterward cut the cord 3. The front ends 86 and 87 of the tongs are shaped in such a manner that they may be engaged by the thread guide 68 which to this end has a suitable outline so as to open the said ends 86 and 87 when the latter pass on both sides of it, the length of the arm 9 and that of the tongs 10 being calculated in such a manner that they allow of the aforesaid engagement. During part of the rotation of the arm 9 the tongs project through a slot 88 in the table 5.

The sectors 11 are arranged in accordance with the circle described by the tongs 10. These sectors carry a sliding member 89 which serves as a brace and is provided on each side with an antifriction roller 12; the said sliding member may be locked in position on the said sectors at any desired spot. The distance between the two rollers 12 is equal to the width of the tongs 10 in a closed state so that at the moment where the front parts of the branches of the tongs pass between the rollers 12, the said branches and consequently the knife edges 84 and 85 are forcibly pressed one on the other and thus cut the cord previously drawn through the molds, the spring 83 not being strong enough for this purpose.

The tilting basket or receptacle 13 is mounted off the center on trunnions 90 pivoted on the arms of a fork 91 which forms the end of a balance beam 92 adapted to oscillate around a shaft 93 and balanced by a suitable movable weight 94. The tilting receptacle is mounted below the table at such a place that it may surely receive the leaden seals falling after the cord has been severed.

The device which is intended to bring the cord again back to the level of the molds and to hold it against falling immediately after the cutting operation, is of the following construction, (Figs. 6 to 9): A small finger or lever 101 is pivoted on a pin 102, and has integral therewith a small cam lever 103 which is at a right angle to the lever 101. The pin 102 is formed on a supporting member 104 which slides horizontally in a guideway provided in a suitable frame 105. The latter is fixed to the table and, together with the table, is formed with a slot through which passes a bolt 106, and an actuating rod 107, both attached to and depending from the support 104. A main lever 108 is pivoted, as at 109, to the underside of the table and reciprocates the support 104, the end 110 of said lever being engaged in an opening 111 provided in the actuating rod 107. The lever 108 has integral therewith and at a right angle thereto a second lever 112, carrying at its end an antifriction roller 113 which is adapted to rotate freely on a shaft 114. This roller is in constant engagement with a cam 115, keyed on the vertical shaft 71 under the table. The cam 115, the roller 113 and the levers 112 and 108 are in the same plane and very near to the underside of the table.

The parts described in the two paragraphs immediately preceding are operative to effect a movement of the support 104 against the tension of a spring 121 to be hereafter referred to. The support 104 in its movements coöperates with an abutment 117 which is provided with a slot 118 which is engaged by the small cam lever 103. The said abutment 117 is secured to the upper part of the frame 105 by means of a screw threaded adjusting rod 118'.

The lever mechanism described is operative to move the support 104 forwardly after the arm 9 passes the molds. The forward movement of the support is continued until the lever 103 engages the forward end of the abutment 117. Such engagement results in the raising of the lever 101, which thereby brings the cord into a horizontal position. The support 104 is moved rearwardly by the spring 121 to allow of the passage of the arm 9 thereby, this movement taking place when the roller 114 engages the irregular surface of the cam 115 and resulting in the lowering of the lever 101 (Fig. 7) when the support 104 engages the rear end of the abutment 117.

A suitable spring 119 is secured to the upper part of the support 4 and carries below a shoe 120 the lower face of which always remains at the level of the mold and exerts a slight pressure on the cord when the latter is raised on the other side by the finger 101. Owing to this arrangement the cord is always held in horizontal position and tensioned evenly after having been cut by the tongs. The spring 121 is secured to the bolt 106 of the support 104 which is thus constantly pulled toward the screw 122 to which the other end of the spring 121 is secured.

The operation of the machine is as follows:—After the crucible 14 has been charged with 10 to 30 kilograms of lead, the gas stove arranged under the crucible is started and its position is adjusted so that a temperature sufficient to melt the lead is obtained. The receptacle 15 is then filled with water and the cock of the duct 28 is opened which conveys the molten lead to the molds. When there is a good circulation of the molten metal, the said cock is closed again and the cord 3 is engaged in the thread guides 30′ and 54 of the molds. The fly wheel of the machine is thereafter rotated so as to lower the actuating levers 34 and 64 and to thus close the mold. The core 32 will have been lowered at the same time and during its descent into the mold 17—20 will have engaged the cord 3 which at this moment is held by the finger or lever 101. The core thus will have forced a U-shaped bight of the cord into mold. While the molds are closed, the pistons 22 and 50 will also have been shifted toward the left and will have uncovered the respective openings of the lead feeding pipe. All that will be necessary then will be to again open the lead introducing cock and at the same time to start the machine.

During the first revolution of the shaft 16 the rotation of the disk 40 causes the levers 34 and 64 to move through half of their upward stroke whereby the core is withdrawn from the mold 6, and the molds 6 and 7 are partly opened. During the second revolution of said shaft, the levers 34 and 64 complete their upward stroke and cause the plungers 22 and 50 to eject the disk 1 and the sleeve 4, from their respective molds, the parts 20 and 53 being at the same time retracted. Immediately preceding this operation, the tongs 10 pass through the slot 88, above the table and its branches are opened automatically by the cord guide 68, the said branches being thereafter gradually closed by the spring 83, as the tongs pass beyond the cord guide. The cord is thus gripped and carried through the molds and ultimately between the sectors where the cutting operation takes place. The arm 9, makes one revolution to every four of the shaft 16. During the third and fourth revolutions of the shaft 16, the levers 34 and 64 complete their downward stroke and the cord is drawn between the sectors 11 and cut in the manner explained, the finished seal falling into the basket 13. The operations above described are repeated *ad infinitum*.

When a determined number of seals have fallen into the basket 13, the latter as is obvious, tilts automatically and discharges its contents into the package provided therefor.

Having now fully described my said invention, what I claim and desire to secure by Letters Patent, is:—

1. In a machine of the type set forth, a pair of independent complete molds for forming lead seal parts upon a cord, means for operating the molds simultaneously to form said parts, a cord spool, means for advancing the cord through the necessary extent, and means for cutting the cord at a required point.

2. In a machine of the type set forth, a pair of independent complete molds for forming lead seal parts upon a cord, each mold comprising opposed coöperating relatively reciprocating parts and one of the parts of each mold serving as an ejector for the molded product, and means for operating the mold parts simultaneously in the respective operations of molding and ejecting the seal parts.

3. In a machine of the type set forth, a mold for producing a lead seal part, the said mold comprising coöperating dies which have relative approaching and receding movements and which are formed with complementary recesses to define an opening when the dies are held against one another, a core movable through the opening and into the mold to form a recess in the lead seal part, a spool having a cord wound thereon, and means for drawing out the cord with relation to the core, whereby the latter as it passes through said opening forces a bight of the cord into the mold.

4. In a machine of the type set forth a mold for producing a lead seal part and comprising a stationary die and a die movable toward and away from the stationary die, the latter comprising a tubular part and a hollow water cooled plunger working in the tubular part and coöperative with the movable die during the molding operation, the tubular part having a lead inlet port which is controlled by the plunger, the movable die comprising a hollow body provided with openings for the circulation of air and with a reinforced asbestos plate which serves as a die face and is opposed to the plunger.

5. In a machine of the type set forth, molds for producing lead seal parts, each mold comprising opposed coöperating dies, guides for supporting a cord with relation to said molds, a spool upon which the said cord is wound, a rotary arm provided with tongs which serve first to grip and then to cut the cord at determined fixed points in the rotation of said arm, and means for operating the tongs in the cutting operation.

6. In a machine of the type set forth, molds for producing lead seal parts, each mold comprising opposed coöperating dies, a spool upon which a cord is wound, guides for supporting the cord with relation to said molds, a rotary arm provided with tongs which serve first to grip and then to cut the cord at determined fixed points in the rotation of said arm, a spring for operating the jaws of the tongs in the gripping operation, a cam associated with one of the guides for opening the jaws of the tongs to receive the cord, a pair of rollers which cause the jaws of the tongs to cut the cord, and a part carrying the rollers and adjustable through a certain extent of the path of the arm in order that the cutting point may be located as desired.

7. In a machine of the type set forth, molds for producing lead seal parts, each mold comprising opposed coöperating dies, a spool upon which a cord is wound, a rotary arm provided with tongs which serve first to grip and then to cut the cord at determined fixed points in the rotation of said arm, means for operating the tongs in the cutting operation, a movable finger constituting a support for the cord, means to cause the finger to extend in an elevated position across the path of the arm and to support the cord with relation to the molds after the arm passes by the latter, and means to retract the finger from the path of the arm immediately preceding and during the passage of the latter past the molds.

8. In a machine of the type set forth, molds for producing lead seal parts, each mold comprising opposed coöperating dies, a spool upon which a cord is wound, a rotary arm provided with tongs which serve first to grip and then to cut the cord at determined fixed points in the rotation of said arm, means for operating the tongs in the cutting operation, a movable finger constituting a support for the cord, means to cause the finger to extend in an elevated position across the path of the arm and to support the cord with relation to the molds after the arm passes by the latter, means to retract the finger from the path of the arm immediately preceding and during the passage of the latter past the molds, the arm having an angularly disposed lever integral therewith and being pivoted at its junction with the lever, and an abutment having a slot through which the lever extends, the latter engaging the abutment at the completion of each stroke of movement of the finger and causing the finger to assume an elevated position across the path of the arm and a lowered position at one side of the path of movement of the arm.

In testimony whereof I have hereunto set my hand in presence of witnesses.

DÉMÉTRIUS DEBBAS.

Witnesses:
 GASTON PETIAN,
 L. PETIAN,
 H. C. COXE.

---

Copies of this patent may be obtained for five cents each, by addressing the " Commissioner of Patents, Washington, D. C."